(12) United States Patent
Kim et al.

(10) Patent No.: US 12,140,838 B2
(45) Date of Patent: Nov. 12, 2024

(54) BARRIER RIB FOR IMAGE DISPLAY DEVICE, MANUFACTURING METHOD THEREFOR, AND IMAGE DISPLAY DEVICE COMPRISING BARRIER RIB

(71) Applicant: DONGWOO FINE-CHEM CO., LTD., Jeollabuk-do (KR)

(72) Inventors: Hun-Sik Kim, Incheon (KR); Tae-Gon Kim, Seoul (KR); Young-Soo Kwon, Gyeonggi-do (KR); Seul-Ki Park, Gyeonggi-do (KR)

(73) Assignee: DONGWOO FINE-CHEM CO., LTD., Iksan (KR)

( * ) Notice: Subject to any disclaimer, the term of this patent is extended or adjusted under 35 U.S.C. 154(b) by 0 days.

(21) Appl. No.: 18/275,795

(22) PCT Filed: Feb. 24, 2022

(86) PCT No.: PCT/KR2022/002690
§ 371 (c)(1),
(2) Date: Aug. 3, 2023

(87) PCT Pub. No.: WO2022/182151
PCT Pub. Date: Sep. 1, 2022

(65) Prior Publication Data
US 2024/0134233 A1 Apr. 25, 2024

(30) Foreign Application Priority Data
Feb. 25, 2021 (KR) .................. 10-2021-0025639

(51) Int. Cl.
*G02F 1/1339* (2006.01)
*G02F 1/1333* (2006.01)
*G02F 1/1335* (2006.01)

(52) U.S. Cl.
CPC .... *G02F 1/13398* (2021.01); *G02F 1/133377* (2013.01); *G02F 1/133382* (2013.01); *G02F 1/133516* (2013.01)

(58) Field of Classification Search
None
See application file for complete search history.

(56) References Cited

U.S. PATENT DOCUMENTS

2008/0241429 A1* 10/2008 Chen ................. G02F 1/133516
430/7
2009/0273745 A1* 11/2009 Liu ....................... G02B 5/201
359/891
(Continued)

FOREIGN PATENT DOCUMENTS

CN 112313579 A * 2/2021
JP 2017161604 A 9/2017
(Continued)

OTHER PUBLICATIONS

International Search Report and Written Opinion for PCT/KR2022/002690, Jun. 3, 2022, 5 pages.

*Primary Examiner* — Ryan Crockett
(74) *Attorney, Agent, or Firm* — BKRIP LLC

(57) ABSTRACT

The present disclosure provides a partition wall for an image display device, the partition wall which satisfies $0.8 \leq A/B < 1.0$ and $0.85 \leq C/B < 1.0$ when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall, a manufacturing method thereof, and an image display device including the partition wall. The partition wall for an image display device according to the present disclosure can be effectively applied to the (Continued)

manufacture of the color conversion pixels through the inkjet process, and the image display device including the partition wall has excellent luminance and maintains high luminance even when observed from the side surface, thereby exhibiting an effect of excellent viewing angle properties.

11 Claims, 2 Drawing Sheets

(56) References Cited

U.S. PATENT DOCUMENTS

| | | | |
|---|---|---|---|
| 2012/0242621 A1* | 9/2012 | Brown | H01L 27/14678 345/175 |
| 2014/0232970 A1* | 8/2014 | Huh | G02F 1/133512 349/110 |
| 2019/0018174 A1* | 1/2019 | Ito | G02B 5/003 |
| 2019/0018282 A1* | 1/2019 | Kitajima | G03F 7/105 |
| 2021/0356778 A1* | 11/2021 | Hsieh | B32B 27/08 |
| 2022/0406832 A1* | 12/2022 | Tanaka | H01L 27/14629 |
| 2023/0422567 A1* | 12/2023 | Ishikawa | H10K 59/38 |
| 2024/0151879 A1* | 5/2024 | Futamata | B32B 27/08 |

FOREIGN PATENT DOCUMENTS

| | | |
|---|---|---|
| JP | 2019132890 A | 8/2019 |
| KR | 101636116 B1 | 12/2013 |
| KR | 20180107146 A | 10/2018 |
| KR | 20190090114 A | 8/2019 |
| WO | 2020017576 A1 | 8/2021 |

* cited by examiner

[FIG. 1]
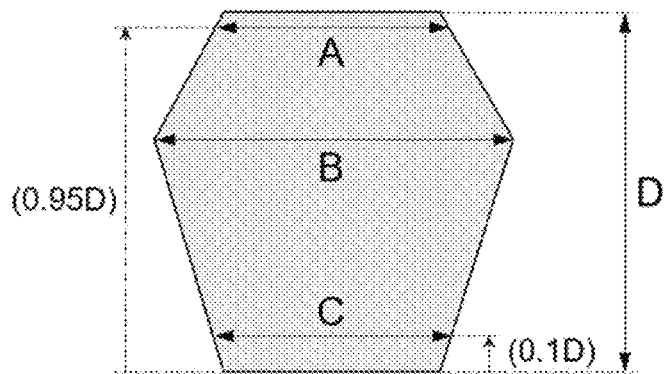
[FIG. 2]
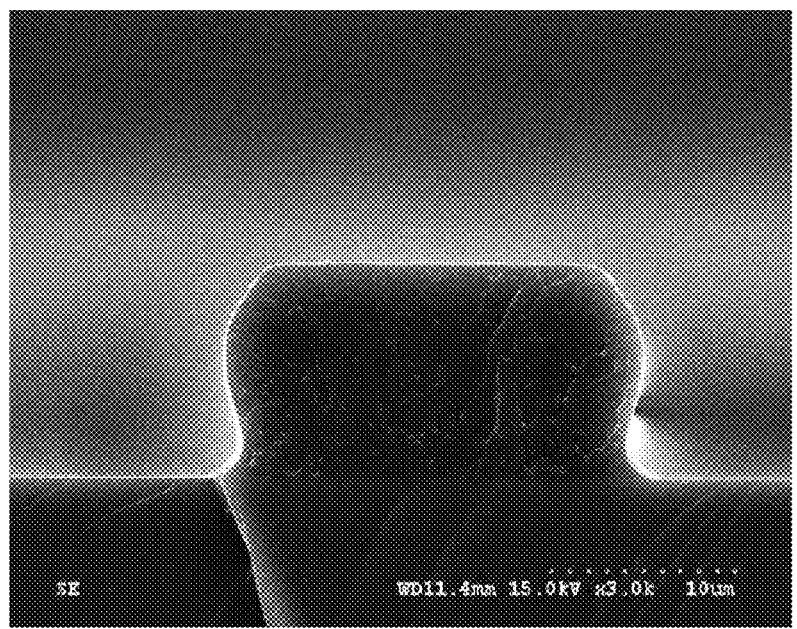

[FIG. 3]
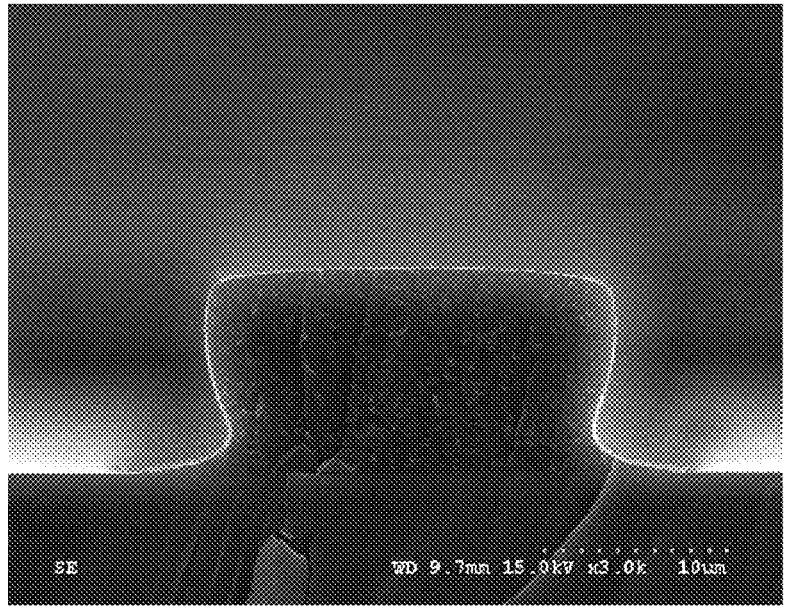
[FIG. 4]
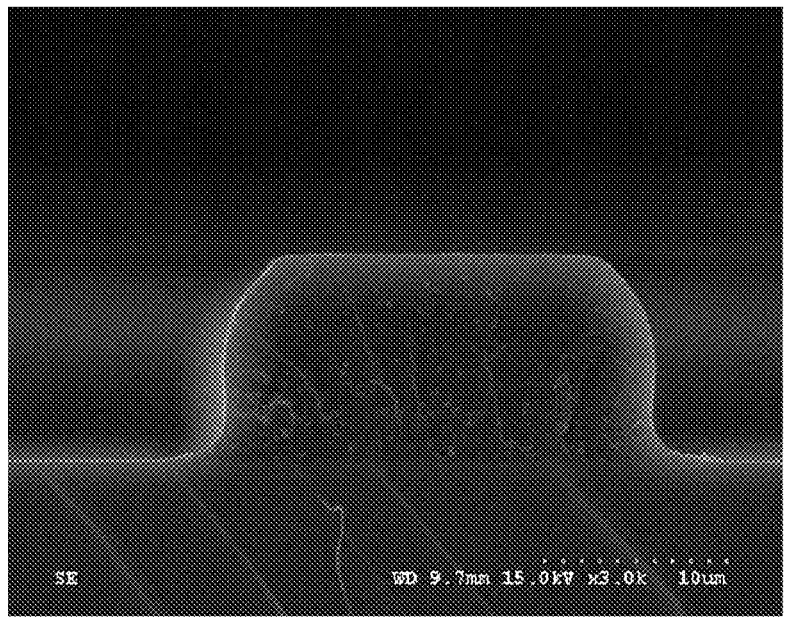
[FIG. 5]
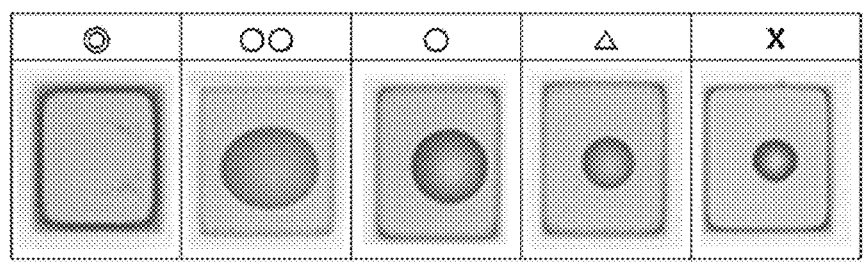

BARRIER RIB FOR IMAGE DISPLAY DEVICE, MANUFACTURING METHOD THEREFOR, AND IMAGE DISPLAY DEVICE COMPRISING BARRIER RIB

TECHNICAL FIELD

The present disclosure relates to a partition wall for an image display device, a method for manufacturing the same, and an image display device including the partition wall.

BACKGROUND ART

A conventional image display apparatus uses a color filter for color formation. In this case, when light emitted from a backlight light source having a white color passes through red, green, and blue color filters, the color filters absorb light of a specific wavelength and light of transmit a specific wavelength to display a desired color. Such transmitted light has a problem in that it has a lot of loss since it is light that is distinguished through absorption and transmission when compared based on the backlight which generates the light.

Recently, research on an image display device using a color conversion layer is being conducted. For example, in a display structure consisting of a color conversion layer together with a backlight that generates blue, a blue pixel can use the light of the backlight intact since it uses the blue color of the backlight as it is. Further, since pixels displaying red to green in the color conversion layer display are displayed by converting blue to red to green, light loss is small compared to the conventional color filter method using absorption and transmission so that excellent light efficiency may be exhibited. However, the conventionally known image display device using the color conversion layer was not sufficiently satisfied with the luminance and viewing angle properties.

Meanwhile, in the case of the photo process generally used to manufacture color conversion pixels for the color conversion layer, there are advantages in that the process is simple and the same product can be mass-produced, but there are problems in that a large amount of wastewater is generated, and the amount of materials actually used is smaller than the amount of materials consumed so that most of the materials are thrown away. Recently, an inkjet process has been applied as a manufacturing process for the color conversion pixels, and has advantages in that wastewater is not generated, and the amount of the materials thrown away can be reduced.

A partition wall and ink are required to proceed with such an inkjet process. The partition wall serves as a weir that divides each pixel region for injecting ink. The formed pixel region is filled with ink through a nozzle. In the inkjet process, when the spreadability and wettability of the ink in the pixel region formed between the partition walls, i.e., the opening, are not sufficient, there are problems in that the process time is increased, and defects in the color conversion pixels are increased.

In relation to this, Korean Patent Application Publication No. 10-2019-0090114 discloses a color conversion member with improved color reproducibility and light efficiency and an electronic device including the same, but does not recognize insufficient viewing angle properties and a problem in the formation of the color conversion pixels through the inkjet process.

PRIOR ART DOCUMENT

[Patent Document]
(Patent Document 1) Korean Patent Application Publication No. 10-2019-0090114

DISCLOSURE

Technical Problem

The present disclosure is to improve the above-described conventional technical problems, and an object of the present disclosure is to provide a partition wall for an image display device, which is capable of improving luminance and viewing angle properties.

Another object of the present disclosure is to provide a partition wall for an image display device, which has excellent spreadability and wettability of the color conversion ink in pixel regions defined by the partition wall, and thus can be effectively applied to an inkjet process for the formation of color conversion pixels.

Still another object of the present disclosure is to provide a method for manufacturing the partition wall for the image display device.

Yet another object of the present disclosure is to provide an image display device including the partition wall for an image display device.

Technical Solution

The present disclosure provides a partition wall for an image display device, which satisfies $0.8 \leq A/B < 1.0$ and $0.85 \leq C/B < 1.0$ when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

Furthermore, the present disclosure provides a method for manufacturing a partition wall for an image display device, the method comprising a step of forming a partition wall on a substrate, wherein the partition wall satisfies $0.8 \leq A/B < 1.0$ and $0.85 \leq C/B < 1.0$ when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

Furthermore, the present disclosure provides an image display device including the partition wall for an image display device.

Advantageous Effects

The image display device including the partition wall for an image display device according to the present disclosure has excellent luminance and maintains high luminance even when observed from the side surface, thereby exhibiting an effect of excellent viewing angle properties.

Further, the partition wall for an image display device of the present disclosure has characteristics in that it has excellent spreadability and wettability of the color conversion ink in the pixel region defined by the partition wall, and thus can be effectively applied to the manufacture of the pixel portion through the inkjet process.

Further, it is possible to provide a high-quality image display device which has excellent luminance and viewing angle and is free from defects in the pixel portion by applying the partition wall for an image display device according to the present disclosure to an image display device.

DESCRIPTION OF DRAWINGS

FIG. 1 is a cross-sectional view for explaining the shape of a partition wall for an image display device according to an embodiment of the present disclosure.

FIG. 2 is an SEM photograph showing a cross section of a partition wall for an image display device according to Example 1 of the present disclosure.

FIG. 3 is an SEM photograph showing a cross section of a partition wall for an image display device according to Comparative Example 2 of the present disclosure.

FIG. 4 is an SEM photograph showing a cross section of a partition wall for an image display device according to Comparative Example 3 of the present disclosure.

FIG. 5 is an evaluation criterion for evaluating inkjet properties in Examples of the present disclosure.

BEST MODE

The present disclosure provides a partition wall for an image display device, which satisfies $0.8 \leq A/B < 1.0$ and $0.85 \leq C/B < 1.0$ when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

Furthermore, the present disclosure provides a method for manufacturing a partition wall for an image display device, the method comprising a step of forming a partition wall on a substrate, wherein the partition wall satisfies $0.8 \leq A/B < 1.0$ and $0.85 \leq C/B < 1.0$ when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

Furthermore, the present disclosure provides an image display device including the partition wall for an image display device.

The present disclosure has been completed by experimentally confirming that the partition wall for an image display device according to the present disclosure can improve luminance and viewing angle properties of an image display device to which it is applied when the shape of the partition wall satisfies the specific conditions described above, and it can be effectively applied to an inkjet process for forming color conversion pixels.

Advantages and features of the present disclosure and methods for achieving them will become apparent with reference to the embodiments described below in detail in conjunction with the accompanying drawings. The present disclosure is not limited to the embodiments disclosed below, but may be implemented in various forms. The present embodiments are provided to complete the disclosure of the present disclosure, and to completely inform those with ordinary skill in the art to which the present disclosure pertains of the scope of the present disclosure.

The shapes, sizes, proportions, angles, numbers, etc. disclosed in the drawings for explaining the embodiments of the present disclosure are exemplary, and thus the present disclosure is not limited to the illustrated matters. The same reference numerals refer to the same elements throughout the specification.

In describing the present disclosure, if it is determined that a detailed description of a related well-known function or configuration may unnecessarily obscure the subject matter of the present disclosure, the detailed description thereof will be omitted. When "including", "having", "consisting", etc. mentioned in the present specification are used, other parts may be added unless "only" is used.

In construing the components, in the case of a description of the positional relationship, for example, when the positional relationship of two parts is described as "on", "on top", "on bottom", "next to", etc., one or more other elements may be positioned between the above two parts unless "right" or "directly" is used.

The respective features of the various embodiments of the present disclosure may be partially or wholly coupled or combined with each other, and may be technically and variously interlocked and driven. Further, the respective embodiments can be implemented independently of each other or can be implemented together in an associated relationship.

Hereinafter, specific embodiments of the present disclosure will be described with reference to the drawings. However, the following drawings attached to the present specification illustrate preferred embodiments of the present disclosure, and serve to further understand the technical spirit of the present disclosure together with the above-described content of the present disclosure. Therefore, the present disclosure should not be construed as being limited only to the matters described in such drawings.

<Partition Wall for Image Display Device>

The present disclosure provides a partition wall for an image display device.

In the image display device, since each pixel represents a color, it is necessary to form a partition wall capable of distinguishing each pixel. In the present disclosure, the partition wall for an image display device may be formed to define pixel regions, that is, to surround the pixel regions.

The pixel region is a region where a pixel portion representing a color is formed, and refers to a region where a coloring composition including red, green, or blue ink and a light emitting material is sprayed or applied, or which is filled with the coloring composition.

Examples of the image display device may include a liquid crystal display device, an organic light emitting diode, a flexible display, and the like, but the present disclosure is not limited thereto, and all display devices known in an applicable field may be exemplified.

FIG. 1 is a cross-sectional view for explaining the shape of a partition wall for an image display device according to an embodiment of the present disclosure. Hereinafter, the shape of the partition wall for an image display device according to the present disclosure will be described in detail with reference to FIG. 1.

In FIG. 1, D refers to the height from the lowermost end portion to the uppermost end portion of the partition wall, that is, the thickness of the partition wall. The thickness (D) of the partition wall is not particularly limited, but it may preferably be 8 to 12 μm, and more preferably 9 to 11 μm. When the partition wall for an image display device satisfies the above thickness range, there is an advantage in that the light efficiency is further improved so that excellent performance of the color conversion pixels can be exhibited.

In the present disclosure, A, B, and C mean the line width of the partition wall measured at a specific height of the partition wall. More specifically, A refers to a line width at a thickness of 95% from the lowermost end portion of the partition wall, that is, a height of 0.95 D. B refers to a maximum line width at a thickness of 50 to 90% from the lowermost end portion of the partition wall, preferably a maximum line width at 60 to 80% thickness from the lowermost end portion of the partition wall. C refers to a line width at a thickness of 10% from the lowermost end portion of the partition wall, that is, a height of 0.1 D.

The partition wall for an image display device according to the present disclosure may satisfy $0.8 \leq A/B < 1.0$, preferably $0.85 \leq A/B < 1.0$.

Further, the partition wall for an image display device according to the present disclosure may satisfy $0.85 \leq C/B < 1.0$, preferably $0.9 \leq C/B < 1.0$.

When the partition wall for an image display device according to the present disclosure satisfies the ranges of A/B and C/B above, pixel regions having an increased surface portion area compared to the partition wall in which all of A, B, and C have the same line width may be formed. Accordingly, the absorption rate of light that is incident from a light source to the pixel portion may be increased to exhibit excellent luminance, and as the angle at which light is emitted from the pixel portion is also improved, a decrease in luminance at the side surface may be reduced to exhibit excellent viewing angle properties.

Further, when the partition wall for an image display device according to the present disclosure satisfies the ranges of A/B and C/B above, pixel regions having an increased volume compared to the partition wall in which all of A, B, and C have the same line width may be formed. Accordingly, since more coloring compositions may be contained in the pixel regions, excellent luminance and color conversion properties may be exhibited by an increase in the light conversion rate.

Meanwhile, in the process of forming the partition wall, the components in the composition for forming the partition wall sublimated during the high-temperature heating process may fall into the pixel regions to generate contaminants. Among these contaminants, the contaminants generated in the central portion of the pixel regions become a major cause of inhibiting the spreadability and wettability of the color conversion ink in the manufacture of the color conversion pixels particularly through the inkjet process. When the partition wall for an image display device according to the present disclosure satisfies the ranges of A/B and C/B above, it may be possible to reduce that contaminants generated in the process of forming the partition wall are attached to the central portion of the pixel regions. Accordingly, the color conversion ink has excellent spreadability and wettability, and thus it may be effectively applied to the manufacture of color conversion pixels through the inkjet process.

The partition wall for an image display device according to the present disclosure may be formed from a photosensitive resin composition for forming the partition wall.

<Photosensitive Resin Composition for Forming Partition Wall>

The photosensitive resin composition for forming a partition wall according to the present disclosure may comprise a colorant, an alkali-soluble resin, a photopolymerizable compound, a photopolymerization initiator, and a solvent, and may further comprise an additive as necessary, but the present disclosure is not limited thereto.

Colorant

The colorant contained in the photosensitive resin composition according to the present disclosure may include a white pigment.

The white pigment is for the reflection properties of the partition wall for an image display device, and specifically, may improve the reflectance of the partition wall. That is, the white pigment may improve the luminance by reflecting light directed toward the partition wall direction among light generated from the pixel portion.

It is preferable that the white pigment has an average particle diameter of 150 nm to 300 nm, and when the average particle diameter thereof is less than 150 nm, there is a problem in that the reflection properties thereof are weakened in a region of 380 nm to 780 nm that is a visible ray region, and when the average particle diameter thereof exceeds 300 nm, there is a problem in that dispersibility and storage stability thereof deteriorate.

In the present disclosure, the "average particle diameter" may be a number average particle diameter, and for example, it can be obtained from an image observed by a field emission-scanning electron microscope (FE-SEM) or a transmission electron microscope (TEM). Specifically, it can be obtained as a value obtained by extracting several samples from the observation images of FE-SEM or TEM, measuring diameters of these samples, and calculating an arithmetic mean.

When the above-described conditions are satisfied, a pigment known in the art may be used as the white pigment. In one or plural embodiments, C.I. Pigment White 4, 5, 6, 6:1, 7, 18, 18:1, 19, 20, 22, 25, 26, 27, 28, 32, etc. may be used, and in terms of reflection efficiency and whiteness, C.I. Pigment White 6 or 22 is preferable, and C.I. Pigment White 6 is more preferable.

These white pigments may be used alone or in mixtures of 2 or more thereof.

Titanium oxide ($TiO_2$) contained in C.I. Pigment White 6 is inexpensive and has excellent reflectance due to a high refractive index thereof, so that it can be used as an effective white colorant and preferably has a rutile structure in terms of whiteness.

Titanium oxide ($TiO_2$) that is a white pigment may be one that has been subjected to, if necessary, resin treatment, surface treatment using pigment derivatives or the like introduced with acidic or basic groups, graft treatment on the pigment surface with a polymer compound, etc., atomization treatment by sulfuric acid atomization method, etc., cleaning treatment with an organic solvent or water to remove impurities, or ionic impurity removal treatment by ion exchange method or the like.

Titanium oxide ($TiO_2$) may include one of which surface is surface-treated with one or more selected from the group consisting of silicon oxide ($SiO_2$), aluminum oxide ($Al_2O_3$), zirconium oxide (ZrO2), and organic materials, preferably, one which is sequentially surface-treated with silicon oxide ($SiO_2$), aluminum oxide ($Al_2O_3$), and zirconium oxide (ZrO2), and more preferably, one which is obtained by surface-treating the outermost surface of surface-treated titanium oxide ($TiO_2$) with an organic material. The organic material is not particularly limited as long as it lowers the energy required when dispersing titanium oxide ($TiO_2$) by performing surface treatment of coating titanium oxide ($TiO_2$) with a single molecular layer of low polarity, and which prevents titanium oxide ($TiO_2$) from being compressed and agglomerated, and in one or a plurality of embodiments, stearic acid, trimethylpropane (T1VIP), pentaerythritol, and the like may be used as the organic material.

It is possible to improve reflective luminance properties while lowering the photocatalytic activity of titanium oxide ($TiO_2$) by surface-treating titanium oxide ($TiO_2$) as described above. In particular, according to a preferred embodiment of the surface treatment, there is an advantage in terms of reliability improvement such as heat resistance, chemical resistance, or the like. The surface treatment may be treatment by encapsulation.

The amount of a titanium oxide (TiO₂) core contained in the surface-treated titanium oxide (TiO₂) is preferably 85 to 95% by weight based on the total weight of the surface-treated titanium oxide (TiO₂). When the surface of the titanium oxide (TiO₂) core is treated within the above range, the surface-treated titanium oxide (TiO₂) core exhibits properties of excellent whiteness and excellent reflective luminance.

Examples of commercial products of titanium oxide (TiO₂) may include DuPont's ⌈R-101⌋, ⌈R-102⌋, ⌈R-103⌋, ⌈R-104⌋, ⌈R-105⌋, ⌈R-350⌋, ⌈R-706⌋, ⌈R-794⌋, ⌈R-796⌋, ⌈TS-6200⌋, ⌈R-900⌋, ⌈R-902⌋, ⌈R-902+⌋, ⌈R-906⌋, ⌈R-931⌈, ⌈R-960 and ⌈R-6200⌋, Huntsman's ⌈R-FC5⌋, ⌈TR81⌋ and ⌈TR88⌋, and ISK's ⌈CR-57⌋, etc.

The colorant of the present disclosure may further include one or more selected from a black pigment, a red pigment, and an orange pigment.

A pigment known in the art may be used as the black pigment, and in one or a plurality of embodiments, lactam black, perylene black, cyanine black, aniline black, carbon black, titanium black, etc. may be used, and these may be used alone or in mixtures of two or more thereof.

The black pigment may one which is surface-treated with a resin if necessary. The surface treatment method is not particularly limited, and for example, it may be performed by a method of surface-treating the surface of carbon black with a compound having an OH group, a compound having a COOH group, and/or a silicone compound. In one embodiment, examples of groups capable of being bonded to polysiloxane represented by (Si—O)$_n$, which may form a branded main chain or ring as needed, and/or a silane compound bonded to oxygen may include hydrogen, an alkyl group, a vinyl group, an aryl group, an alkylaryl group, an aralkyl group, and the like.

Examples of commercial products of the black pigment may include Mitsubishi's ⌈MA77⌋, ⌈MA7⌋, ⌈MA8⌋, ⌈MA11⌋, ⌈MA100⌋, ⌈MA100R⌋, ⌈MA100S⌋, ⌈MA230⌋, ⌈MA220⌋ and ⌈MA14⌋, BAS's ⌈Paliogen Black L 0086⌋, ⌈Lumogen Black L 0087⌋, ⌈Lumogen Black L 0088⌋, ⌈Sicopal Black L 0095⌋, ⌈Paliogen Black L 0084⌋ and ⌈Irgaphor Black S 0100CF⌋, etc.

The red pigment may be one or more selected from diketopyrrole-based or diketopyrrolopyrrole-based pigments, anthraquinone-based pigments, perylene-based pigments, and azo-based pigments, and may specifically be one or more selected from the group consisting of C.I. Pigment Red 9, 97, 81, 105, 122, 123, 144, 149, 150, 155, 166, 168, 171, 175, 176, 177, 179, 180, 185, 192, 202, 208, 209, 214, 215, 216, 220, 222, 224, 242, 254, 255, 264, 269, 270, and 272, but is not particularly limited.

The orange pigment may be one or more selected from quinophthalone-based pigments, isoindolinone-based pigments, and diketopyrrolopyrrole-based pigments, and may specifically be one or more selected from the group consisting of C.I. Pigment orange 13, 15, 31, 36, 38, 40, 42, 43, 51, 55, 59, 61, 64, 65, and 71, but is not particularly limited.

The colorant may be contained in an amount of 0.5 to 30% by weight, preferably 1.0 to 20% by weight, based on the total weight of the solid content in the photosensitive resin composition. When the colorant is contained within the above amount range, there is an advantage in that light-shielding properties against light may be further increased.

In the present disclosure, the total weight of the solid content in the photosensitive resin composition means the total weight of the remaining components in the photosensitive resin composition except for the solvent.

Alkali-Soluble Resin

The alkali-soluble resin serves to prevent pigment particles present in the photosensitive resin composition from being dissolved in a solvent by coating the pigment particles, and to prevent an increase in viscosity due to agglomeration between the pigment particles.

The alkali-soluble resin is not particularly limited, but may include a copolymer represented by Chemical Formula 1 below.

[Chemical Formula 1]

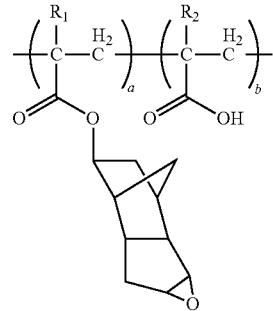

(In Chemical Formula 1, $R_1$ and $R_2$ are each independently hydrogen or a methyl group, and the molar ratio of the monomer a and the monomer b is 1:20 to 20:1.)

Solvent resistance, storage stability, and residual film rate may be improved by including the copolymer of Chemical Formula 1 above containing an epoxy group as an alkali-soluble resin in the present disclosure.

The weight average molecular weight of the alkali-soluble resin is not particularly limited, but may be 3,000 to 100,000, preferably 3,000 to 50,000, and more preferably 5,000 to 50,000.

The alkali-soluble resin has an acid value of 50 to 200 mg KOH/g based on the solid content, and may improve the dispersion stability of the pigment within the above range.

The alkali-soluble resin may be a copolymer with other monomer copolymerizable with the copolymer represented by Chemical Formula 1 above.

Specific examples of the monomer of the alkali-soluble resin that is copolymerizable with Chemical Formula 1 may include: aromatic vinyl compounds such as styrene, vinyltoluene, α-methylstyrene, p-chlorostyrene, o-methoxystyrene, m-methoxystyrene, p-methoxystyrene, o-vinylbenzylmethylether, m-vinylbenzylmethylether, p-vinylbenzylmethylether, o-vinylbenzylglycidylether, m-vinylbenzylglycidylether, and p-vinylbenzylglycidylether; alkyl (meth)acrylates such as methyl(meth)acrylate, ethyl(meth)acrylate, n-propyl(meth)acrylate, i-propyl(meth)acrylate, n-butyl(meth)acrylate, i-butyl(meth)acrylate, sec-butyl (meth)acrylate, and t-butyl(meth)acrylate; alicyclic(meth)acrylates such as cyclopentyl(meth)acrylate, cyclohexyl (meth)acrylate, 2-methylcyclohexyl(meth)acrylate, tricyclo[5.2.1.0(2,6)]decan-8-yl (meth)acrylate, 2-dicyclopentanyloxyethyl(meth)acrylate, and isobornyl(meth)acrylate; aryl(meth)acrylates such as phenyl(meth)acrylate and benzyl(meth)acrylate; hydroxyalkyl(meth)acrylates such as 2-hydroxyethyl(meth)acrylate and 2-hydroxypropyl(meth) acrylate; N-substituted maleimide compounds such as N-cyclohexylmaleimide, N-benzylmaleimide, N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-m-methoxyphenylmaleimide, and N-p-methoxyphenylmaleimide; unsaturated amide compounds such as (meth)acrylamide and N,N-dimethyl(meth)acrylamide; unsaturated oxetane compounds such as 3-(methacryloyloxymethyl)oxetane, 3-(methacryloyloxymethyl)-3-ethyloxetane, 3-(methacryloyloxymethyl)-2-trifluoromethyloxetane, 3-(methacryloyloxymethyl)-2-phenyloxetane, 2-(methacryloyloxymethyl)oxetane, and 2-(methacryloyloxymethyl)-4-trifluoromethyloxetane; and the like.

The compounds exemplified above may be respectively used alone or in combinations of two or more thereof.

The alkali-soluble resin of the present disclosure may be used by further mixing with various other known alkali-soluble resins generally used in the art, if necessary.

The alkali-soluble resin may be contained in an amount of 20 to 70% by weight, preferably 30 to 60% by weight, based on the total weight of the solid content in the photosensitive resin composition. When the alkali-soluble resin is contained within the above amount range, the pigment particles are evenly dispersed, and agglomeration between the pigment particles may be prevented, and thus there is an advantage in that solvent resistance and storage stability are improved.

Photopolymerizable Compound

The photopolymerizable compound is a compound that can be polymerized by light and heat, a polymerizable compound known in the art may be selected and used without particular limitation as long as it can be polymerized by light and heat, and specific examples thereof may include a monofunctional monomer, a bifunctional monomer, another polyfunctional monomer, etc.

The types of the monofunctional monomer, the bifunctional monomer, and the polyfunctional monomer are not particularly limited, and examples of the polyfunctional monomer may include trimethylolpropane tri(meth)acrylate, ethoxylated trimethylolpropane tri(meth)acrylate, propoxylated trimethylolpropane tri(meth)acrylate, pentaerythritol tri(meth)acrylate, pentaerythritol tetra(meth)acrylate, dipentaerythritol tri(meth)acrylate, dipentaerythritol penta(meth)acrylate, ethoxylated dipentaerythritol hexa(meth)acrylate, propoxylated dipentaerythritol hexa(meth)acrylate, dipentaerythritol hexa(meth)acrylate, etc.

The photopolymerizable compound may be contained in an amount of 5 to 50% by weight, preferably 10 to 45% by weight, based on the total weight of the solid content of the photosensitive resin composition. It is preferable in terms of strength or smoothness of the pixel portion that the photopolymerizable compound is contained within the above amount range.

Photopolymerization Initiator

As the photopolymerization initiator, a photopolymerization initiator known in the art may be selected and used without particular limitation. Examples of the photopolymerization initiator may include acetophenone-based compounds, benzophenone-based compounds, triazine-based compounds, thioxanthone-based compounds, oxime-based compounds, benzoin-based compounds, biimidazole-based compounds, and the like, and examples of commercial products of the photopolymerization initiator may include Ciba's ⌈OXE-01⌋, ⌈OXE-02⌋, and ⌈OXE-03⌋, BASF's IRGACURE OXE-03, or the like.

The photopolymerization initiators may be used alone or in mixtures of two or more thereof.

The photopolymerization initiator may be contained in an amount of 0.01 to 15% by weight, preferably 0.1 to 10% by weight, based on the total weight of the solid content of the photosensitive resin composition. When the photopolymerization initiator is contained within the above amount range, the photopolymerization reaction rate is appropriate, which makes it possible to preferably prevent an increase in the overall process time, and preventing deterioration of the physical properties of a final cured film due to the photoreaction.

The photosensitive resin composition according to the present disclosure may further comprise a photopolymerization initiation aid in addition to the photopolymerization initiator. When the photopolymerization initiation aid is used together with the photopolymerization initiator, the photosensitive resin composition becomes more sensitive, which makes it possible to preferably improve productivity.

The photopolymerization initiation aid is a compound used to promote polymerization of a photopolymerizable compound whose polymerization is initiated by the photopolymerization initiator, and one or more compounds selected from the group consisting of amines and carboxylic acid compounds may be used as the photopolymerization initiation aid.

The photopolymerization initiation aid may be contained in an amount of typically 0.001 to 10 moles, preferably 0.01 to 5 moles, based on 1 mole of the photopolymerization initiator. When the photopolymerization initiation aid is contained within the above range, a productivity improvement effect may be expected by improving the photopolymerization efficiency.

Solvent

The solvent is not particularly limited as long as it is effective in dissolving other components contained in the photosensitive resin composition, and various organic solvents known in the field of the photosensitive resin composition may be used.

In one or a plurality of embodiments, examples of the solvent may include: ethylene glycol monoalkyl ethers such as ethylene glycol monomethyl ether, ethylene glycol monoethyl ether, ethylene glycol monopropyl ether, and ethylene glycol monobutyl ether; diethylene glycol dialkyl ethers such as diethylene glycol dimethyl ether, diethylene glycol diethyl ether, diethylene glycol dipropyl ether, and diethylene glycol dibutyl ether; ethylene glycol alkyl ether acetates such as methyl cellosolve acetate and ethyl cellosolve acetate; alkylene glycol alkyl ether acetates such as propylene glycol monomethyl ether acetate, propylene glycol monoethyl ether acetate, propylene glycol monopropyl ether acetate, methoxybutyl acetate, and methoxypentyl acetate; aromatic hydrocarbons such as benzene, toluene, xylene, and mesitylene; ketones such as methyl ethyl ketone, acetone, methyl amyl ketone, methyl isobutyl ketone, and cyclohexanone; alcohols such as ethanol, propanol, butanol, hexanol, cyclohexanol, ethylene glycol, and glycerin; esters such as ethyl 3-ethoxypropionate and methyl 3-methoxypropionate; cyclic esters such as γ-butyrolactone; etc.

The solvent may be preferably an organic solvent having a boiling point of 100 to 200° C. in terms of coatability and drying properties, and more preferably propylene glycol monomethyl ether acetate, propylene glycol monoethyl ether acetate, cyclohexanone, ethyl lactate, butyl lactate, ethyl 3-ethoxypropionate, methyl 3-methoxypropionate, and the like.

The solvents may be used alone or in mixtures of two or more thereof, and the solvent may be contained in an amount of 60 to 90% by weight, preferably 70 to 85% by weight, based on the total weight of the photosensitive resin composition. When the solvent is contained within the above amount range, it preferably provides an effect of improving the applicability when the solvent is applied with an application device such as a roll coater, a spin coater, a slit and spin coater, a slit coater (die coater), or an inkjet.

Additive

The photosensitive resin composition according to the present disclosure may further comprise an additive as necessary, and the type of the additive may be determined according to a user's needs, and is not particularly limited in the present disclosure.

In one or a plurality of embodiments, at least one selected from a dispersant, a wetting agent, a silane coupling agent, and an anti-agglomeration agent may be used.

A commercially available surfactant may be used as the dispersant, and examples of the surfactant may include a silicone-based surfactant, a fluorine-based surfactant, a silicone-based surfactant having a fluorine atom, and mixtures thereof.

Examples of the silicone-based surfactant may include surfactants having a siloxane bond, and the like. Examples of commercial products thereof may include 「Toray Silicon DC3PA」, 「Toray Silicon SH7PA」, 「Toray Silicon DC11PA」, 「Toray Silicon SH21PA」, 「Toray Silicon SH28PA」, 「Toray Silicon 29SHPA」, 「Toray Silicon SH30PA」, and polyether-modified silicone oil 「SH8400」 manufactured by Toray Silicone Co., Ltd., 「IKP321」, 「IKP322」, 「KP323」, 「KP324」, 「KP326」, 「IKP340」, and 「IKP341」 manufactured by Shin-Etsu Silicone Co., Ltd., 「TSF400」, 「TSF401」, 「TSF410」, 「TSF4300」, 「TSF4440」, 「TSF4445」, 「TSF-4446」, 「TSF4452」, and 「TSF4460」 manufactured by GE Toshiba Silicon Co., Ltd., etc.

Examples of the fluorine-based surfactant may include surfactants having a fluorocarbon chain, and the like. Examples of commercial products thereof may include 「Prolinate (product name) FC430」and 「Prolinate FC431」 manufactured by Sumitomo 3M Co., Ltd., 「Megapack (product name) F142D」, 「Megapack F171」, 「Megapack F172」, 「Megapack F173」, 「Megapack F177」, 「Megapack F183」, and 「Megapack R30」 manufactured by Dainippon Ink Chemical Co., Ltd., 「Ftop (product name) EF301」, 「Ftop EF303」, 「Ftop EF351」, and 「Ftop EF352」manufactured by Shin-Akita Kasei Co., Ltd., 「Suffron (product name) S38L」, 「Suffron S382」, 「Suffron SC101」, and 「Suffron SC105」 manufactured by Asahi Glass Co., Ltd., 「E5844」 manufactured by Daikin Fine Chemicals Co., Ltd., 「BM-1000」 and 「BM-1100」 (product name) manufactured by BMChemie, etc.

Examples of the silicone-based surfactant having a fluorine atom may include surfactants having a siloxane bond and a fluorocarbon chain, and the like. Examples of commercial products thereof may include 「Megapack (product name) R08」, 「Megapack BL20」, 「Megapack F475」, 「Megapack F477」, and 「Megapack F443」 manufactured by Dainippon Ink Chemicals Co., Ltd., etc.

As the wetting agent, glycerin, diethylene glycol, and ethylene glycol may be used, and the wetting agents may be used alone or in mixtures of two or more thereof.

Examples of the silane coupling agent may include aminopropyltriethoxysilane, γ-mercaptopropyltrimethoxysilane, and γ-methacryloxypropyltrimethoxysilane, and examples of commercial products thereof may include 「SH6062」 and 「SZ6030」manufactured by Toray-Dow Corning Silicon Co., Ltd., 「KBE903」, 「KBM803」, and 「KBM-9007」 manufactured by Shin-Etsu Silicone Co., Ltd., etc.

Examples of the anti-agglomeration agent may include sodium polyacrylate.

The photosensitive resin composition of the present disclosure may be prepared by a conventional method known in the art, and the preparation method is not particularly limited in the present disclosure.

In one embodiment of the present disclosure, the colorant is mixed with a solvent in advance and dispersed using a bead mill or the like. At this time, a pigment dispersant is used as needed, and there may also a case that some or all of the alkali-soluble resin is blended. After the remainder of the alkali-soluble resin, the photopolymerizable compound and the photopolymerization initiator, and an additive, if necessary, are added to the obtained dispersion, an additional solvent is further added thereto to a predetermined concentration as necessary, to obtain the desired photosensitive resin composition.

<Method of Manufacturing Partition Wall for Image Display Device>

Further, the present disclosure provides a method for manufacturing a partition wall for an image display device.

The method for manufacturing a partition wall for an image display device according to the present disclosure may comprise a step of forming a partition wall on a substrate, wherein the partition wall may satisfy $0.8 \le A/B < 1.0$ and $0.85 \le C/B < 1.0$ when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

The meanings of A to C and the technical advantages in the case of satisfying the ranges of A/B and C/B are the same as those described in the above-described partition wall for an image display device.

The step of forming the partition wall on the substrate may comprise: a coating film forming step of applying a photosensitive resin composition onto the substrate and then performing heat drying; an exposure step of irradiating the formed coating film with ultraviolet rays; a pattern forming step of contacting a developer with the exposed coating film to perform development; and a post-curing step of curing the formed pattern.

First, the photosensitive resin composition of the present disclosure is applied onto the substrate, and then heat drying is performed to remove volatile components such as a solvent or the like, thereby forming a smooth coating film.

Application may be performed by an application method such as spin coating, a flexible coating method, a roll coating method, a slit and spin coating method, or a slit coating method. After application, heat drying (pre-baking) is performed to volatilize volatile components such as solvents. The thickness of the coating film after heat drying is usually about 7 to 15 μm. Here, the heat drying is not particularly limited, but is preferably performed at 90 to 100° C. for 120 to 180 seconds. When the heat-drying temperature and time ranges are satisfied, there is an advantage in that it is easy to manufacture a partition wall for an image display device satisfying the ranges of A/B and C/B.

The coating film obtained in this way is irradiated with ultraviolet rays through a mask for forming a target pattern. When ultraviolet rays are irradiated, radicals are formed at the site irradiated with ultraviolet rays by the photopolymerization initiator, and photocuring is performed by reacting the radicals with the polymerizable compound. At this time, it is preferable to use a device such as a mask aligner or a stepper so that parallel rays are uniformly irradiated to the entire exposed portion and accurate positioning of the mask and the substrate is performed.

The mask pattern may include a first pattern for integrally forming the pixel portion and the partition wall and a second pattern for forming only the partition wall. For example, the first pattern may be a pattern in which a pixel portion region to be integrally formed with the partition wall and a region where a neighboring partition wall is to be formed are integrally formed.

g-rays (wavelength: 436 nm), h-rays, i-rays (wavelength: 365 nm), etc. may be used as the ultraviolet rays. The ultraviolet irradiance may be appropriately selected as needed, and is not limited in the present disclosure.

A partition wall pattern may be formed by contacting the photocuring-completed coating film with a developer to dissolve the unexposed portion and performing development. Here, the developer is not particularly limited as long as it is commonly used in the art, but a developer having a conductivity of 1,100 to 1,300 s/m may be used. Further, the step of forming the partition wall pattern is not particularly limited, but is preferably performed by spraying the developer at a pressure of 1.0 to 1.3 mpa. When the conductivity and pressure ranges of the developer are satisfied, there is an advantage in that it is easy to manufacture a partition wall for an image display device satisfying the ranges of A/B and C/B.

The pattern may be made hard by passing the pattern shape thus obtained through a post-curing process. Here, the post-curing step is usually performed at 150 to 250° C. for 5 to 35 minutes, but may be performed preferably at 200 to 220° C. for 30 to 35 minutes. When the post-curing temperature and time ranges are satisfied, there is an advantage in that it is easy to manufacture a partition wall for an image display device satisfying the ranges of A/B and C/B.

<Image Display Device>

Further, the present disclosure provides an image display device including the partition wall for an image display device. In short, the image display device according to the present disclosure may include a partition wall formed from the above-described photosensitive resin composition for forming a partition wall.

Specifically, the image display device may include other components that may be usually included in an image display device, such as an optical film or the like, in addition to the partition wall for an image display device according to the present disclosure, but the present disclosure is not limited thereto.

Specific examples of the image display device may include display devices such as a liquid crystal display (liquid crystal display device; LCD), an organic EL display (including an organic EL display device, OLED, and QLED), an inorganic light emitting diode (LED) display, a liquid crystal projector, a game display device, a display device for a portable terminal of a mobile phone or the like, a display device for a digital camera, a display device for car navigation, and the like, but the present disclosure is not limited thereto.

When the image display device includes the partition wall for an image display device according to the present disclosure, there is an advantage in that it is possible to provide a high-quality image display device having excellent luminance and viewing angle, and having no defects in the pixel portion.

Hereinafter, although the present disclosure is described in more detail based on Examples, embodiment of the present disclosure disclosed below are only for illustrative purposes, and the scope of the present disclosure is not limited to these embodiments. The scope of the present disclosure is defined in the claims, and moreover, includes all modifications within the meaning and scope equivalent to those defined in the claims. Further, "%" and "part" indicating the content in the following Examples and Comparative Examples are based on mass unless otherwise specified.

EXAMPLE

Preparation Examples: Preparation of Photosensitive Resin Compositions

Photosensitive resin compositions were prepared according to the constituents and contents described in Table 1 below.

TABLE 1

| (Unit: parts by weight) | | Preparation Example 1 | Preparation Example 2 | Preparation Example 3 | Preparation Example 4 |
|---|---|---|---|---|---|
| Colorant | A-1 | 8 | 7 | 5 | 5 |
|  | A-2 | — | 1 | — | — |
|  | A-3 | — | — | 4 | — |
|  | A-4 | — | — | — | 4 |
| Alkali-soluble resin | B | 41 | 41 | 41 | 41 |
| Photopolymerizable compound | C | 42 | 42 | 41 | 41 |
| Photopolymerization initiator | D | 8.5 | 8.5 | 8.5 | 8.5 |
| Solvent | E | 300 | 300 | 300 | 300 |
| Additive | F | 0.5 | 0.5 | 0.5 | 0.5 |

A-1: TiO$_2$ (TR-88, manufactured by Huntsman)
A-2: Carbon Black (MA100, manufactured by Mitsubishi)
A-3: C.I. Pigment Orange 64 (PV Fast Orange H2GL, manufactured by Clariant)
A-4: C.I. Pigment Red 177 (Cromophtal, manufactured by BASF)
B: 3,4-epoxytricyclo[5.2.1.0$^{2,6}$]decan-9-yl acrylate/methacrylic acid copolymer (molar ratio = 60/40, Mw = 7200)
C: dipentaerythritol hexaacrylate (KAYARAD DPHA, manufactured by Nippon Chemical Co., Ltd.)
D: IRGACURE OXE-03 (manufactured by BASF)
E: propylene glycol monomethyl ether acetate (PGMEA)
F: Silane coupling agent (KBM-9007, manufactured by Shin-Etsu Chemical Co., Ltd.)

Example 1: Manufacturing of Partition Wall

A 5 cm×5 cm glass substrate (Corning Incorporated) was washed sequentially with a neutral detergent, water, and alcohol, and then dried. In order to form a partition wall, the glass substrate was spin-coated with the photosensitive resin composition of Preparation Example 1 to a final film thickness of 10.0 μm, and pre-baked at 90° C. for 150 seconds in a clean oven. After the prebaked substrate was cooled to room temperature, the distance from a quartz glass photomask was set to 50 m, and an exposure machine (TME-150RSK; manufactured by Topcon Co., Ltd.) was used to irradiate the substrate with light with an exposure amount of 100 mJ/cm². For the irradiation at this time, reflected light from an ultra-high pressure mercury lamp was used. In this case, a photomask having a pattern formed on the same plane was used as the photomask. A mask for forming the partition wall has a blocking portion (unexposed portion) in a rectangular form inside, and a light transmitting portion (pattern) has a form in which straight line forms for serving as the partition wall cross each other. After light irradiation, an aqueous developer (conductivity=1100 s/m) containing 0.12% by weight of a nonionic surfactant and 0.04% by weight of potassium hydroxide was sprayed at a pressure of 1.0 mpa using a press-type developing machine to proceed with the development process. After washing with water, post-baking was performed at 210° C. for 30 minutes in a clean oven to form a partition wall.

Examples 2 to 10 and Comparative Examples 1 to 6: Manufacturing of Partition Walls The partition walls were formed by performing the processes in the same manner as in Example 1, except that the photosensitive resin composition of Preparation Example 1 used in Example 1 and the respective process conditions were changed according to the compositions and conditions described in Table 2 below.

TABLE 2

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Photosensitive resin composition | G-1 | G-1 | G-1 | G-1 | G-1 | G-1 | G-1 | G-2 | G-3 | G-4 |
| Pre-baking temperature (° C.) | 90 | 90 | 95 | 100 | 95 | 93 | 95 | 100 | 95 | 95 |
| Pre-baking time (sec) | 150 | 180 | 180 | 150 | 120 | 165 | 155 | 145 | 135 | 130 |
| Developer conductivity (m/s) | 1100 | 1150 | 1300 | 1200 | 1200 | 1150 | 1130 | 1200 | 1180 | 1200 |
| Developer pressure (mpa) | 1.0 | 1.1 | 1.3 | 1.1 | 1.1 | 1.0 | 1.3 | 1.1 | 1.1 | 1.1 |
| Post-baking temperature (° C.) | 210 | 220 | 210 | 200 | 220 | 220 | 210 | 200 | 220 | 220 |
| Post-baking time (min) | 30 | 30 | 30 | 35 | 30 | 30 | 30 | 35 | 30 | 30 |

|  | Comparative Example | | | | | |
| --- | --- | --- | --- | --- | --- | --- |
|  | 1 | 2 | 3 | 4 | 5 | 6 |
| Photosensitive resin composition | G-1 | G-1 | G-1 | G-1 | G-1 | G-1 |
| Pre-baking temperature (° C.) | 85 | 85 | 85 | 85 | 85 | 85 |
| Pre-baking time (sec) | 100 | 100 | 120 | 85 | 90 | 110 |
| Developer conductivity (m/s) | 1700 | 1800 | 1750 | 1650 | 1600 | 1500 |
| Developer pressure (mpa) | 0.8 | 0.9 | 0.8 | 0.8 | 0.9 | 0.9 |
| Post-baking temperature (° C.) | 240 | 240 | 235 | 240 | 240 | 235 |
| Post-baking time (min) | 30 | 30 | 25 | 30 | 30 | 25 |

G-1: photosensitive resin composition according to Preparation Example 1
G-2: photosensitive resin composition according to Preparation Example 2
G-3: photosensitive resin composition according to Preparation Example 3
G-4: photosensitive resin composition according to Preparation Example 4

Experimental Example (1) Measurement of Partition Wall Shapes

For the partition walls manufactured according to Examples 1 to 10 and Comparative Examples 1 to 6, the partition wall shapes were photographed using FE-SEM equipment (Regulus 8240, Hitachi), and the thicknesses (D) of the respective partition walls and the line widths (A to C) at the specific thicknesses were measured. The results are shown in Table 3 below and FIGS. 2 to 4.

The line width A means the line width at a thickness of 95% from the lowermost end portion of the partition wall, the line width B means the maximum line width at a thickness of 50 to 90% from the lowermost end portion of the partition wall, and the line width C means the line width at a thickness of 10% from the lowermost end portion of the partition wall.

(4) Evaluation of Inkjet Process Characteristics

For the partition walls according to Examples 1 to 10 and Comparative Examples 1 to 6, 1 drop (10 pico-liter) of white ink* was dropped into the pixel regions defined by the

TABLE 3

|  | Example |  |  |  |  |  |  |  |  |  | Comparative Example |  |  |  |  |  |
|---|---|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 | 5 | 6 |
| Film thickness D (μm) | 10.2 | 10.1 | 10.3 | 10.2 | 10.5 | 10.5 | 10.3 | 10.4 | 10.5 | 10.5 | 9.8 | 10.1 | 10.2 | 10.5 | 11.3 | 10.5 |
| Line width A (μm) | 18.3 | 18.4 | 19.7 | 19.4 | 18.8 | 19.4 | 20.6 | 21.1 | 21.1 | 18.9 | 17.4 | 21.8 | 17.5 | 17.2 | 21.8 | 16.4 |
| Line width B (μm) | 22.2 | 21.6 | 22.8 | 22.4 | 21.3 | 21.8 | 22.5 | 23.1 | 23.1 | 20.8 | 23.1 | 21.5 | 21.9 | 23.1 | 21.5 | 21.9 |
| Line width C (μm) | 20.4 | 20.3 | 20.1 | 20.5 | 20.6 | 20.2 | 21.8 | 21.2 | 21.8 | 20.2 | 20.3 | 15.6 | 22.3 | 13.5 | 12.1 | 11.3 |
| A/B | 0.82 | 0.85 | 0.86 | 0.87 | 0.88 | 0.89 | 0.92 | 0.91 | 0.91 | 0.91 | 0.75 | 1.01 | 0.80 | 0.74 | 1.01 | 0.75 |
| C/B | 0.92 | 0.94 | 0.88 | 0.92 | 0.97 | 0.93 | 0.97 | 0.92 | 0.94 | 0.97 | 0.88 | 0.73 | 1.02 | 0.58 | 0.56 | 0.52 |

(2) Evaluation of Luminance Properties

With respect to the partition walls according to Examples 1 to 10 and Comparative Examples 1 to 6, 20 drops (10 pico-liter per drop) of red quantum dot ink* were injected into the pixel regions defined by the partition wall through an inkjet process to form pixels. A blue light source was injected into the pixels with a power consumption of 30 mW to emit red light, and then luminance values thereof were measured using CAS 140CT (Instrument System). The ratios of the luminance values of the red light to the luminance values of the blue light source (red light luminance values/blue light source luminance values, %) were calculated and shown in Table 4 below.

*Red Quantum Dot Ink: A red quantum dot ink composition comprising red quantum dots, a scatterer ($TiO_2$), a photopolymerizable compound (DPHA), and a photopolymerization initiator (IRGACURE OXE-03).

partition walls using OmniJet 300 (UniJet Co., Ltd.), and spreadability and wettability of the ink within the pixel regions were evaluated in accordance with the evaluation criteria below and the criteria of FIG. 5. The results are shown in Table 4 below.

*White ink: A white ink composition comprising a scatterer ($TiO_2$), a photopolymerizable compound (DPHA), and a photopolymerization initiator (IRGACURE OXE-03).

<Evaluation Criteria for Inkjet Process Characteristics>

⊚: When 1 drop is dropped, the ink wets the partition wall

○○: When 1 drop is dropped, the size of the ink is 30 μm or more

○: When 1 drop is dropped, the size of the ink is 20 μm or more and less than 30 μm Δ: When 1 drop is dropped, the size of the ink is 10 μm or more and less than 20 μm x: When 1 drop is dropped, the size of the ink is less than 10 m

TABLE 4

|  | Example |  |  |  |  |  |  |  |  |  | Comparative Example |  |  |  |  |  |
|---|---|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 | 5 | 6 |
| Luminance evaluation (%) | 86.5 | 86.9 | 84.8 | 85.9 | 87.5 | 88.2 | 89.2 | 87.9 | 91.3 | 91.8 | 82.4 | 81.5 | 68.4 | 81.2 | 83.4 | 84.5 |
| Viewing angle (°) | 64 | 68 | 62 | 66 | 68 | 62 | 69 | 58 | 60 | 62 | 48 | 42 | 35 | 55 | 45 | 51 |
| Inkjet process characteristics | ⊚ | ○○ | ○ | ○○ | ⊚ | ⊚ | ○ | ⊚ | ⊚ | ⊚ | Δ | Δ | X | Δ | X | X |

(3) Evaluation of Viewing Angle Properties

The viewing angle is a very important evaluation factor in the properties of an image display device.

In the present disclosure, with respect to the pixels formed in '(2) Evaluation of luminance properties', the luminance values at the side surface were measured by gradually changing the angle based on the front surface (0°), and the viewing angle properties were evaluated by checking the angles at which the 50% luminance values were measured based on the luminance values of the blue light source. The results are shown in Table 4 below.

The larger the viewing angle, the higher the luminance is maintained even when observed from the side surface. Therefore, a high-quality image display device may be obtained.

Referring to the results of Table 4 above, it can be confirmed that the pixels formed using the partition walls of Examples 1 to 10 of the present disclosure that satisfy 0.8≤A/B<1.0 and 0.85≤C/B<1.0 exhibit excellent effects in all of luminance, viewing angle, and inkjet process characteristics.

Meanwhile, it can be confirmed that the pixels formed using the partition walls of Comparative Examples 1 to 6 that do not satisfy 0.8≤A/B<1.0 and/or 0.85≤C/B <1.0 have reduced luminance, viewing angle, and inkjet process characteristics, and particularly have greatly reduced viewing angle and inkjet process characteristics.

The invention claimed is:

1. A partition wall for an image display device formed from a photosensitive resin composition for forming a partition wall, comprising a colorant, an alkali-soluble resin, a photopolymerizable compound, a photopolymerization initiator, and a solvent, wherein the colorant includes white pigment, and wherein the partition wall which satisfies 0.8≤A/B<1.0 and 0.92≤C/B<1.0 when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

2. The partition wall of claim 1, wherein B is the maximum line width at a thickness of 60 to 80% from the lowermost end portion of the partition wall.

3. The partition wall of claim 1, wherein the partition wall is formed to define pixel regions.

4. The partition wall of claim 1, wherein the partition wall has a thickness of 8 to 12 μm.

5. An image display device including the partition wall for an image display device according to claim 1.

6. The partition wall of claim 1, wherein the photosensitive resin composition comprises: 0.5 to 30% by weight of a colorant; 20 to 70% by weight of an alkali-solubleresin; 5 to 50% by weight of a photopolymerizable compound; and 0.01 to 10% by weight of a photopolymerization initiator, based on the total weight of the solid content of the photosensitive resin composition, and comprises 60 to 90% by weight of a solvent based on the total weight of the photosensitive resin composition.

7. A method for manufacturing a partition wall for an image display device, the method comprising a step of forming a partition wall on a substrate; and forming the partition wall from a photosensitive resin composition comprising a colorant, an alkali-soluble resin, a photopolymerizable compound, a photopolymerization initiator, and a solvent, wherein the colorant includes white pigment, wherein the partition wall satisfies 0.8≤A/B<1.0 and 0.92≤C/B<1.0 when the line width at a thickness of 95% from the lowermost end portion of the partition wall is A, the maximum line width at a thickness of 50 to 90% from the lowermost end portion of the partition wall is B, and the line width at a thickness of 10% from the lowermost end portion of the partition wall is C, with respect to the total thickness of the partition wall.

8. The method of claim 7, wherein the step of forming the partition wall comprises:
a coating film forming step of applying a photosensitive resin composition onto the substrate and then performing heat drying;
an exposure step of irradiating the formed coating film with ultraviolet rays;
a pattern forming step of contacting a developer with the exposed coating film to perform development; and
a post-curing step of curing the formed pattern.

9. The method of claim 8, wherein the heat drying in the coating film forming step is performed at 90 to 100° C. for 120 to 180 seconds.

10. The method of claim 8, wherein the pattern forming step is performed by spraying a developer having a conductivity of 1,100 to 1,300 s/m at a pressure of 1.0 to 1.3 mpa.

11. The method of claim 8, wherein the post-curing step is performed at 200 to 220° C. for 30 to 35 minutes.

* * * * *